United States Patent [19]

Higaki et al.

[11] Patent Number: 4,742,120

[45] Date of Patent: May 3, 1988

[54] CURABLE RESIN COMPOSITION

[75] Inventors: Hiromichi Higaki; Nobuyuki Miyazaki; Takashi Takayanagi, all of Yokohama, Japan

[73] Assignee: Asahi Glass Company Ltd., Tokyo, Japan

[21] Appl. No.: 798,131

[22] Filed: Oct. 28, 1985

Related U.S. Application Data

[63] Continuation of Ser. No. 570,296, Jan. 13, 1984, abandoned.

[30] Foreign Application Priority Data

Feb. 18, 1983 [JP] Japan .................... 58-24678

[51] Int. Cl.$^4$ ...................... C08L 51/00; C08L 27/12; C08L 27/22
[52] U.S. Cl. .................... 525/276; 525/151; 525/385
[58] Field of Search ................ 525/276, 72, 385, 151

[56] References Cited

U.S. PATENT DOCUMENTS

| | | | |
|---|---|---|---|
| 3,257,334 | 6/1966 | Chen et al. ..................... | 525/276 |
| 3,790,645 | 2/1974 | Murayama et al. ................ | 525/276 |
| 3,894,118 | 7/1975 | Aronoff et al. ..................... | 525/276 |
| 4,316,836 | 2/1982 | Aufdermash ........................ | 524/535 |
| 4,446,270 | 5/1984 | Guenthner et al. ................ | 524/535 |

FOREIGN PATENT DOCUMENTS

| | | | |
|---|---|---|---|
| 2336625 | 7/1973 | Fed. Rep. of Germany . | |
| 52004589 | 7/1975 | Japan .............................. | 525/276 |
| 857088 | 12/1960 | United Kingdom ............... | 525/276 |
| 1019466 | 2/1966 | United Kingdom . | |

*Primary Examiner*—Carman J. Seccuro
*Attorney, Agent, or Firm*—Oblon, Fisher, Spivak, McClelland & Maier

[57] ABSTRACT

A curable resin composition which comprises a synthetic resin and a polymerizable compound as the essential constituents, characterized in that said synthetic resin is a fluorine-containing polymer which has 10% by weight or more of fluorine atoms and is soluble in said polymerizable compound or a mixture of said polymerizable compound and a volatile solvent to be added to said compound depending on necessity, and that said polymerizable compound contains therein unsaturated bonds or epoxy group.

17 Claims, No Drawings

CURABLE RESIN COMPOSITION

This application is a continuation, of application Ser. No. 570,296, filed Jan. 13, 1984, now abandoned.

The present invention relates to a curable resin composition, and more particularly, it is concerned with a curable resin composition containing therein a particular fluorine-containing polymer and a polymerizable compound.

The curable resin compositions containing therein a synthetic resin and a polymerizable compound have already been known and used in the field of reactive type adhesives, solventless or high solids coatings, and others. However, those conventional curable resin compositions had disadvantages such that their fields of application were restricted from the standpoint of their processability such as, for example, their wettability with a substrate, on which they are to be coated, and penetrability into the substrate or a mold; and the characteristics of a cured body of the resin composition such as, for example, heat resistance, moisture resistance, and so forth.

In the knowledge of the above-described points of problems, the present inventors have conducted strenuous studies and researches, as the result of which they have found that a composition containing therein a particular fluorine-containing polymer and a polymerizable compound is able to solve such points of problems.

It is therefore an object of the present invention to provide an improved curable resin composition suitable for use in various industrial fields.

It is another object of the present invention to provide an improved curable resin composition having favorable processability and characteristics of the cured body.

According to the present invention, in general aspect of it, there is provided an improved curable resin composition containing therein a synthetic resin and a polymerizable compound as the essential constituents, characterized in that said synthetic resin is a fluorine-containing polymer which has 10% by weight or more of fluorine atoms and is soluble in said polymerizable compound or a mixture of said polymerizable compound and a readily volatile solvent to be added to said compound depending to necessity, and that said polymerizable compound contains therein unsaturated bonds or epoxy groups.

The foregoing objects, other objects as well as specific ingredients and their compositional ratios for the curable resin composition according to the present invention will become more apparent from the following detailed description thereof in reference to several preferred examples to readily put the present invention into practice.

It is important that, in the present invention, use is made of a fluorine-containing polymer, as the synthetic resin, which contains therein 10% by weight or more of fluorine atoms and is soluble in the polymerizable compound or a mixture of the compound and the readily volatile solvent to be added to it depending on necessity. When the synthetic resin of a very low fluorine content is used, not only the effect of improvement in the processability of the curable resin composition is poor, but also no favorable result comes out from the aspect of the characteristics of the cured body. On the other hand, even those fluorine-containing polymers having 10% by weight or more of fluorine atoms may not be applicable for the intended purposes, if they are insoluble in the polymerizable compound, because such insoluble synthetic resins exist in a state of being segregated, in the cured body, from a polymer to be produced from the polymerization reaction with the polymerizable compound without yielding entanglement of the molecular chains or formation of the network matrix between these both polymers. Examples of such fluorine-containing polymers are: polytetrafluoroethylene, a copolymer of tetrafluoroethylene and hexafluoropropylene, a copolymer of tetrafluoroethylene and perfluoroalkyl vinyl ether, polychlorotrifluoroethylene, a copolymer of tetrafluoroethylene and ethylene, a copolymer of chlorotrifluoroethylene and ethylene, and so forth.

For the fluorine-containing polymer to be used in the present invention, any of the addition polymers and the condensation polymers may be used, provided that they satisfy the above-mentioned conditions. For the addition polymers, there may be exemplified those addition polymers or addition copolymers produced from various fluorine-containing unsaturated compounds. For the condensation polymers, there may be exemplified fluorine-containing bifunctional epoxy resin, fluorine-containing condensates such as diol, dibasic acids, dibasic acid anhydride, diisocyanate, and so on which form the ester bonding, urethane bonding, urea bonding and so forth.

From the aspect of convenience in working in the processing steps of the resin composition as well as the mechanical characteristics of the cured body of the resin composition, those addition polymers can be favorably adopted as the fluorine-containing polymer. Also, from the aspect of formation of the network matrix with the polymer to be produced from the polymerization reaction with the polymerizable compound, there may be adopted preferably those fluorine-containing polymers having the cure sites such as a hydroxy group, an epoxy group, a carboxylic group, an acid amide group, an ester group, an unsaturated bond, an active hydrogen atom, a halogen atom, and so on.

The representative examples of the addition polymers suitable for the present invention are: polyvinylidene fluoride, a copolymer of tetrafluoroethylene and propylene, a copolymer of vinylidene-fluoride hexafluoropropylene, propylene, and tetrafluoroethylene, copolymers of alkyl vinyl ether and fluoro-olefins such as tetrafluoroethylene, chlorotrifluoroethylene, and others. Of these addition polymers, the copolymers of fluoro-olefins and alkyl vinyl ethers may be adopted preferably because the cured body of the resin composition with high content of the fluorine-containing polymer can be readily obtained from them.

As the fluoro-olefin/vinyl ether type copolymers which can be suitably used in the present invention, there may be exemplified those which contain therein fluoro-olefin and vinyl ether as their respective ratios, in unit, of 30 to 70 mol % and 70 to 30 mol %, and possess their intrinsic viscosity in a range of from 0.05 to 2.0 dl/g or so, measured in tetrahydrofuran at 30° C. their uncured condition. Preferred examples of the fluoro-olefin component are tetrafluoroethylene and chlorotrifluoroethylene. Preferred examples of the vinyl ether component are alkyl vinyl ethers containing therein the linear, branched, or cyclic alkyl group having 2 to 8 carbon atoms. Co-monomers which provide the cure sites in such copolymers may be preferably selected from vinyl ethers containing therein the functional groups such as, for example, hydroxyalkyl vinyl ether, glycidyl vinyl ether, and so forth.

It is further important that the polymerizable compound to be used in the present invention should contain therein the unsaturated bonds or epoxy group. Such compound should preferably assume a liquid state at the time of its polymerization reaction. Representative examples of the polymerizable compound having the unsaturated bonds are: unsaturated acid esters such as acrylic acid ester, methacrylic acid ester, etc.; vinyl esters such as vinyl acetate, vinyl butyrate, etc.; unsaturated acid amide such as acrylic acid amide, N-methylol acrylic acid amide, etc.; dienes such as butadiene, isoprene, chloroprene, etc.; and styrene, and so on. Typical examples of the polymerizable compound having the epoxy group are: propylene oxide, styrene oxide, bisphenol A glycidyl ether, acrylic glycidyl ether, glycidyl acrylate, and so forth. Such polymerizable compound is used at a rate of from 5 to 500 parts by weight, or preferably from 10 to 300 parts by weight with respect to 100 parts by weight of the above-mentioned fluorine-containing polymer.

According to the present invention, it is possible to use a readily volatile solvent together with the polymerizable compound with a view to promoting dissolution of the fluorine-containing polymer. While such solvent may be appropriately selected in accordance with solubility of the particular fluorine-containing polymer, the typical examples thereof are acetone, methylethyl ketone, dichloromethane, trichlorotrifluoro ethane, ethyl acetate, and so on. The quantity of use of the solvent should preferably be kept to the minimum necessary. In ordinary case, it is desirable to limit the quantity to 200 parts by weight or below with respect to 100 parts by weight of the above-mentioned fluorine-containing polymer. Such solvent should preferably be removed by appropriate expedient such as pre-heating, etc. prior to the polymerization reaction of the above-mentioned polymerizable compound in preparation for processing of the resin composition.

It is further possible to add to the resin composition of the present invention a polymerization initiator, a hardener, and a cross-linking agent for the above-mentioned fluorine-containing polymer. As the polymerization initiator, there may be exemplified azobisisobutyronitrile, benzoyl peroxide, dicumylic peroxide and other radical initiators; and organic polyamine, acid anhydride and other hardeners for epoxy. As the cross-linking agent, there may be used various kinds depending on the cure sites of the fluorine-containing polymer. Examples of such cross-linking agent for the fluorine-containing polymer having its cure sites on the hydroxy group are: melamine type, urea resin type, polybasic acid type, epoxy type, silicone type, blocked polyisocyanate type, and various others, as have been used in ordinary thermosettable acrylic coatings, all of which are effective for the purpose of the present invention. In addition to these polymerization initiators and cross-linking agents, it is of course possible to use a polymerization promotor and a cross-linking promotor, and so forth.

There may also be added to the resin composition of the present invention various additives such as coloring agent, filler, stabilizer, and others in an appropriate quantity with a view to improving identification, mechanical strength, adhesiveness, durability, and various other properties of the resin composition. Typical examples of such additives are: phthalocyanine green, titanium oxide, alumina, talc, calcium carbonate, silica, and so forth.

The hardening of the resin composition according to the present invention advances with the polymerization reaction of the polymerizable compound to result in a cured body of the resin composition having entanglement of network matrix or molecular chains of the polymer to be produced from the polymerization reaction and the fluorine-containing polymer, or the chemical bonding thereof. As the expedient for initiating the polymerization reaction, there may possibly be adopted irradiation of light, electron beam, or gamma-ray; heating by a heat source; use of the initiator, hardener, etc.; and others. From the aspect of the working efficiency, however, a method, in which the initiator, hardener, or the like is included in the resin composition in advance and then activated by heating, may preferably be adopted.

The curable resin composition according to the present invention possesses its characteristic same as, or closer to, the solventless resin composition, and moreover, it has the fluorine-containing polymer as its essential constituent, owing to which it can exhibit various remarkable advantages in the fields of adhesives, paint coatings, and, further, casting material. In the first place, as the adhesive, it is excellent in its wettability with the substrate and is capable of avoiding difficulty such as blister caused by the residual solvent in it with the consequence that rigid adhesion can be attained. At the same time, the resin composition is feasible for its application in a high temperature atmosphere and/or high humidity atmosphere, which could not be successful with the conventional resin composition of this sort. As the coating material, the resin composition of the present invention is capable of high build-up coating, which can reduce the number of times for coating applications, and also is useful as an impregnation coating due to its easy penetration. Furthermore, the coated film thus obtained is excellent in its weather-resistant property, which makes it possible to retain luster and color tone of the coated film over a long period of time. In addition, when used as the casting material, the resin composition of the present invention exhibits excellent property of providing articles in complicated configuration with high precision.

With a view to enabling those persons skilled in the art to reduce the present invention into practice with less difficulty, the following preferred examples are presented. It should however be noted that these examples are illustrative only and not so restrictive, and that any changes and modificiations may be made to the components and their ratios by those skilled in the art within the spirit and scope of the invention as recited in the appended claims. It should further be noted that, in the ensuing examples (both inventive examples and comparative ones), "part(s)" represents "part(s) by weight" unless otherwise indicated.

EXAMPLE 1 AND COMPARATIVE EXAMPLES 1 AND 2

100 parts of quaternary copolymer consisting of chlorotrifluoroethylene, ethyl vinyl ether, cyclohexyl vinyl ether, and hydroxybutyl vinyl ether at their respective mol ratio of 50/25/15/10 was mixed with 100 parts of vinyl acetate and 2 parts of benzoyl peroxide in a three-roller mill to prepare a curable resin composition.

The thus obtained curable resin composition was applied onto a copper plate (of 0.8 mm thick) and a copper foil (of 100 μm thick) with the surface thereof having been cleaned, to the respective thickness of 30 μm. Immediately after this, both copper plate and copper foil were laminated with their coated surfaces being opposed, followed by pressing of the laminate for 40 minutes by means of a hot press under a pressure of 2 kg/cm² and at a temperature of 150° C., whereby a laminated body was obtained. The thus obtained laminated body showed its adhesive strength (peeling at 180° C. in accordance with ASTM D-903) of 2.1 kg/cm.

For the sake of comparison, two kinds of laminated bodies were made in the same manner as mentioned above by use of a resin composition consisting of 100 parts of the above-mentioned quaternary copolymer, 2 parts of benzoyl peroxide, and 100 parts of xylene (Comparative Example 1) and another resin composition consisting of 100 parts of vinyl acetate and 2 parts of benzoyl peroxide (Comparative Example 2). The thus prepared laminated bodies indicated their respective adhesive strength of 1.2 kg/cm and 0.6 kg/cm.

Further, the above-mentioned copper laminated bodies were left for ten days under a high humidity atmosphere of 95% RH at 50° C., after which their adhesive strength was tested in the same manner as mentioned above. With the copper laminated body of Example 1 according to the present invention, there could be observed no substantial decrease in its adhesive strength. With the copper laminated bodies of Comparative Examples 1 and 2, however, their adhesive strength lowered by 80% or less of the initial values. Furthermore, no change at all could be observed with the copper laminated body of Example 1 when it was subjected to a solder bath heat test (immersion of the laminated body for 20 seconds in the solder bath at 260° C.). With the copper laminated bodies of Comparative Examples 1 and 2, however, there occurred peeling at their interface.

EXAMPLE 2

100 parts of the same quaternary copolymer same as that of Example 1 above was kneaded in a ball mill for 24 hours together with 50 parts of methyl methacrylate, 50 parts of styrene, and 50 parts of titanium oxide ("TIPAQUE CR-50" produced and sold by Ishiwara Sangyo K.K., Japan). Subsequently, 1 part of azobisisobutyronitrile was added to the kneaded material, and mixed by agitation to prepare the curable resin composition.

The thus obtained curable resin composition was applied on an aluminum plate (of 0.8 mm thick) and an aluminum foil (of 50 μm thick) to the respective thickness of 30 μm. Then, both aluminum plate and aluminum foil were put together and pressed by a hot press in the same manner as described in Example 1 above, thereby obtaining a laminated body. This laminated body of aluminum indicated its adhesive strength of 2.9 kg/cm.

Further, the laminated body was subjected to exposure in a high humidity atmosphere of 95% RH at 50° C. for ten days. The test result revealed no decrease in its adhesive strength.

EXAMPLE 3 AND COMPARATIVE EXAMPLE 3

The curable resin composition was prepared in the same manner as mentioned in Example 2 above with the exception that 50 parts of butyl acrylate was used in place of 50 parts of styrene, and 6 parts of a melamine type hardener ("CYMEL 303" produced and sold by Mitsui-Toatsu Kogyo K.K., Japan) and an acid catalyst ("CATALYST #6000" produced and sold by Mitsui-Toatsu Kogyo K.K., Japan) were used in place of 1 part of azobisisobutyronitrile.

The above-mentioned resin composition was applied onto a glass plate with the surface thereof having been treated with silane ("Y-5254" produced and sold by Nippon Unicar K.K., Japan) to a thickness of 200 μm by use of an applicator, followed by heating of the coated glass plate at 150° C. for 40 minutes. As a result, there was obtained a cured coating having a flat and smooth surface and being free from pin-holes.

For the sake of comparison, the same processing as mentioned above was conducted using a resin composition (Comparative Example 3), wherein 100 parts of xylene was used instead of 50 parts of methylmethacrylate and 50 parts of butyl acrylate in the Example 3 composition of the present invention. A multitude of pin-holes were observed in the coated film.

EXAMPLE 4

100 parts of a ternary copolymer consisting of tetrafluoroethylene, propylene, and glycidyl vinyl ether at their respective mol ratio of 50/40/10 was mixed with 200 parts of vinyl acetate and 2 parts of benzoyl peroxide, thereby obtaining the resin composition.

When the thus prepared resin composition was used for the laminating test as in Example 2 above, the adhesive strength of the laminated body indicated a value of 2.5 kg/cm. Further, when the laminated body was left for ten days in a high humidity atmosphere of 95% RH at 50° C., its adhesive strength showed a value of 2.4 kg/cm.

EXAMPLE 5

The resin composition was prepared in the same manner as in Example 4 above with the exception that 50 parts of styrene and 50 parts of tetrahydrofuran were used in place of 200 parts of vinyl acetate in the resin composition of Example 4.

The thus prepared composition was used for the laminating test in the same manner as in Example 2 above with the exception that, in this Example, the resin-coated surface was dried with air prior to the lamination, thereby evaporating tetrahydrofuran. The adhesive strength of the laminated member indicated a value of 2.2 kg/cm.

EXAMPLE 6

100 parts of the same quaternary copolymer as that of Example 1 above was mixed with 40 parts of bisphenol type epoxy resin ("DER-331" produced and sold by Dow Chemical Corp., U.S.A.), 40 parts of polyglycol type epoxy resin ("DER-736" produced and sold by Dow Chemical Corp., U.S.A.), 100 parts of dichloromethane, and 10 parts of metaphenylene diamine, thereby preparing the resin composition.

The thus prepared resin composition was applied on two sheets of stainless steel plate (SUS 304" having a thickness of 0.8 mm) to a thickness of 30 μm and dried with air. Thereafter, the sheets of stainless steel was laminated under a pressure of 2 kg/cm² for 40 minutes at a temperature of 150° C., thereby obtaining a laminated body.

The thus obtained laminated body was subjected to tensile sheer test (ASTM D-1002), which revealed the adhesive strength of the laminated member to have a value of 120 kg/cm.

Further, the above-mentioned laminated member was left for ten days in a high humidity atmosphere of 95% RH at 50° C., after which the adhesive strength thereof was measured. It was verified that the laminated member retained its initial adhesive strength to a substantial extent. Also, the laminated body showed no abnormality as the result of the solder bath heat test.

EXAMPLE 7

100 parts of a polycondensate, as the fluorine-containing polymer, consisting of 34 mol % of 1,3-di(2-hydroxyhexafluroropropyl)-benzene, 33 mol % of 1,5-dihydroxy-2,2',3,3',4,4'-hexafluoro pentane, and 33 mol % of epichlorohydrin (having an intrinsic viscosity of 0.1 at 30° C. in tetrahydrofuran) was mixed with 100 parts of styrene and 1 part of azobisisobutyronitrile, thereby preparing the curable resin composition.

To the above-mentioned resin composition, there was added 25 parts of an isocyanate type hardener ("CORONATE EH" produced and sold by Nippon Polyurethane K.K., Japan). Thereafter, the thus obtained resin composition was applied on a copper plate and a copper foil, followed by laminating them by means of a hot press in the same manner as in Example 1 above, thereby obtaining a laminated member.

The thus obtained laminated member indicated its adhesive strength of 2.3 kg/cm. It was also found out that, even after the laminated body was left for ten days in a high humidity atmosphere of 95% RH at 50° C., it retained its adhesive strength at the value almost same as that of the initial stage.

We claim:

1. A curable resin composition comprising as its essential constituents:
   (1) a synthetic resin; and
   (2) a polymerizable compound; characterized in that the said synthetic resin is a flourine-containing polymer which as 10% by weight or more of fluorine atoms and is dissolved in the said polymerizable compound, wherein the said fluorine-containing polymer is an addition polymer having cure sites which are incorporated by a cure site-providing comonomer, said cure site being at least one member selected from the group consisting of hydroxyl groups, epoxy groups, carboxylic groups, acid amide groups, ester groups, unsaturated bonds, active hydrogen atoms, chlorine, bromine, and iodine atoms, and
   wherein the said polymerizable compound contains at least one unsaturated bond or an epoxy group.

2. A curable resin composition comprising as essential constituents:
   (1) a synthetic resin; and
   (2) a polymerizable compound; characterized in that the said synthetic resin is a flourine-containing polymer which has 10% by weight or more of flourine atoms and is dissolved in the said polymerizable compound, wherein the said fluorine-containing polymer is an addition polymer having cure sites which are incorporated by a cure site-providing comonomer, said cure sites being at least one member selected from the group consisting of hydroxyl groups, epoxy groups, carboxylic groups, acid amide groups, ester groups, unsaturated bonds, active hydrogen atoms, chlorine, bromine, and iodine atoms,
   wherein the said polymerizable compound contains at least one unsaturated bond or an epoxy group, and
   wherein from 10 to 300 parts by weight of the said polymerizable compound is present in the composition per 100 parts by weight of the said fluorine-containing polymer.

3. The curable resin composition of claim 1, wherein the said addition polymer is a copolymer of a fluoro-olefin, an alkyl vinyl ether, and a cure site-providing comonomer.

4. The curable resin composition of claim 3, wherein the said copolymer contains fluoro-olefin units and vinyl ether units at a molar ratio of from 30:70 to 70:30.

5. The curable composition of claim 4, wherein the said copolymer has an intrinsic viscosity in the range of from about 0.05 to about 2.0 dl/g as measured in tetrahydrofuran at 30° C.

6. The curable resin composition of claim 3, wherein the fluoro-olefin is tetrafluoroethylene and chlorotrifluoroethylene.

7. The curable resin compositon of claim 3, wherein the alkyl vinyl ether contains a linear, branched or cyclic alkyl group containing from 2 to 8 carbon atoms.

8. A curable resin composition, comprising as its essential constituents;
   (1) a synthetic resin; and
   (2) a polymerizable compound; wherein
   said synthetic resin is a flourine-containing polymer which has 10% by weight or more of fluorine atoms and is dissolved in the said polymerizable compound, wherein the said fluorine-containing polymer is an addition polymer having cure sites which are incorporated by a cure site-providing comonomer.
   said addition polymer being at least one member selected from the group consisting of polyvinylidene fluoride polymers, tetrafluoroethylene and propylene copolymers, vinylidene-fluoride and hexafluoropropylene and tetrafluoroethylene copolymers, and alkylvinyl ether and fluoro-olefin copolymers;
   said cure sites being at least one member selected from the group consisting of hydroxy groups, epoxy groups, carboxylic groups, acid amide groups, ester groups, unsaturated bonds, active hydrogen atoms, chloride, bromine and iodine atoms; and
   wherein said polymerizable compounds is at least one member selected from the group consisting of unsaturated acid esters, vinyl esters, unsaturated acid amides, dienes, styrene, propylene oxide, styrene oxide, bis-phenol A glycidyl ether, acrylic glycidyl ether, and glycidyl alcrylate.

9. The curable resin composition of claim 8, wherein said addition polymer is a copolymer of a fluoro-olefin, an alkylvinyl ether, and a cure site-providing comonomer.

10. The curable resin composition of claim 9, wherein said copolymer contains fluoro-olefin units and vinyl ether units at a molar ratio from 30:70 to 70:30.

11. The curable resin composition of clailm 10, wherein said copolymer has an intrinsic viscosity in the range of from 0.05 to 2.0 dl g$^{-1}$ as measured in tetrahydrofuran at 30° C.

12. The curable resin composition of claim 9, wherein the fluoro-olefin is tetrafluoroethylene and chlorotrifluoroethylene.

13. The curable resin composition of claim 9, wherein the alkylvinyl ether contains a linear, branched or cyclic alkyl group containing from 2 to 8 carbon atoms.

14. The curable resin composition of claim 8, wherein said fluoro-olefin component of said alkylvinyl ether and fluoro-olefin copolymers comprises tetrafluoroethylene or chlorotrifluoroethylene.

15. The curable resin composition of claim 8, wherein said vinyl esters comprises vinyl acetate, or vinyl butyrate.

16. The curable resin composition of claim 8, wherein said unsaturated acid amide comprises acrylic acid amide, or N-methylol acrylic acid amide.

17. The curable resin composition of claim 8, wherein said dienes comprises butadiene, isoprene, or chloroprene.

* * * * *